US012132752B2

(12) United States Patent
Weber et al.

(10) Patent No.: US 12,132,752 B2
(45) Date of Patent: Oct. 29, 2024

(54) IDENTIFICATION OF MALICIOUS DOMAIN CAMPAIGNS USING UNSUPERVISED CLUSTERING

(71) Applicant: Palo Alto Networks, Inc., Santa Clara, CA (US)

(72) Inventors: Michael Edward Weber, Los Altos, CA (US); Jun Wang, Fremont, CA (US); Yuchen Zhou, Newark, CA (US); Wei Xu, Fremont, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 18/481,764

(22) Filed: Oct. 5, 2023

(65) Prior Publication Data

US 2024/0048579 A1 Feb. 8, 2024

Related U.S. Application Data

(63) Continuation of application No. 16/033,959, filed on Jul. 12, 2018, now Pat. No. 11,818,151.

(60) Provisional application No. 62/622,491, filed on Jan. 26, 2018.

(51) Int. Cl.
G06F 21/00 (2013.01)
H04L 9/40 (2022.01)
H04L 61/4511 (2022.01)

(52) U.S. Cl.
CPC ...... *H04L 63/1425* (2013.01); *H04L 61/4511* (2022.05); *H04L 63/0245* (2013.01); *H04L 63/1441* (2013.01)

(58) Field of Classification Search
None
See application file for complete search history.

(56) References Cited

U.S. PATENT DOCUMENTS

| | | | |
|---|---|---|---|
| 8,359,402 B2 * | 1/2013 | Cross | H04L 67/568 709/233 |
| 9,363,282 B1 | 6/2016 | Yu et al. | |
| 9,516,058 B2 * | 12/2016 | Antonakakis | H04L 61/4511 |
| 10,185,761 B2 | 1/2019 | Mahjoub et al. | |
| 10,505,970 B2 * | 12/2019 | McGrew | H04L 63/1408 |
| 2010/0037314 A1 | 2/2010 | Perdisci et al. | |
| 2012/0042381 A1 | 2/2012 | Antonakakis et al. | |
| 2012/0084860 A1 * | 4/2012 | Cao | H04L 63/1441 726/23 |
| 2012/0303808 A1 | 11/2012 | Xie | |
| 2015/0026809 A1 | 1/2015 | Altman et al. | |
| 2016/0065534 A1 * | 3/2016 | Liu | G06F 16/951 707/728 |
| 2016/0099967 A1 | 4/2016 | Stemm et al. | |

(Continued)

*Primary Examiner* — Maung T Lwin
(74) *Attorney, Agent, or Firm* — Gilliam IP PLLC

(57) ABSTRACT

The technology presented herein enables the use of a clustering algorithm to identify additional malicious domains based on known malicious domains. A domain identifier system identifies a first plurality of domain names associated with a malicious domain campaign and seeding a first clustering algorithm with the first plurality of domain names. After seeding the first clustering algorithm, the domain identifier system uses the first clustering algorithm to process passive domain name system (DNS) records to identify and group a second plurality of domain names associated with the malicious domain campaign.

20 Claims, 7 Drawing Sheets

(56) References Cited

U.S. PATENT DOCUMENTS

| | | |
|---|---|---|
| 2017/0041333 A1 | 2/2017 | Mahjoub et al. |
| 2017/0318035 A1 | 11/2017 | Baughman et al. |
| 2018/0097835 A1 | 4/2018 | McGrew et al. |
| 2018/0343272 A1 | 11/2018 | Khalil et al. |
| 2018/0351972 A1 | 12/2018 | Yu et al. |
| 2019/0052650 A1 | 2/2019 | Hu et al. |
| 2019/0190961 A1 | 6/2019 | McGrew et al. |

\* cited by examiner

IDENTIFICATION OF MALICIOUS DOMAIN CAMPAIGNS USING UNSUPERVISED CLUSTERING

RELATED APPLICATIONS

This application is related to and claims priority to U.S. patent application Ser. No. 16/033,959, entitled "IDENTIFICATION OF MALICIOUS DOMAIN CAMPAIGNS USING UNSUPERVISED CLUSTERING," filed on Jul. 12, 2018, which claims priority to U.S. Provisional Patent Application No. 62/622,491, entitled "IDENTIFICATION OF MALICIOUS DOMAIN CAMPAIGNS USING UNSUPERVISED CLUSTERING," filed on Jan. 26, 2018, and which both are hereby incorporated by reference in their entirety.

TECHNICAL BACKGROUND

Many times, legitimate entities may register one or more domain names corresponding to an event or topic in order to direct people to a website having information about that event or topic. For instance, if a company's user records are breached by an outside entity, the company may set up a website as part of a campaign to inform the company's users about how they can go about protecting themselves from adverse effects of the breach. That web site may be reachable via a domain name registered by the company for the specific event, such as "www.companysecuritybreach2018.com.sup.". The use of such domains for a campaign is intended to provide users with a typically easier to remember direct link to the website for the information.

Unfortunately, domain names are sometimes registered with malicious intent to take advantage of the people, and/or the computing devices they are using, who intend to visit the legitimate website set up for the campaign (e.g., information phishing, malware distribution, or really anything other than what a user expects from a legitimate website for a campaign). For instance, domain names may be registered using typos that are likely to occur when a user attempts to enter a legitimate domain name, using wording similar to the legitimate domain, using wording relevant to the event, or some other name that a user may inadvertently be likely to use. Using the example from above, a malicious domain may be registered as "www.compnysecuritybreach2018.com" where the user forgets an 'a' in the address or "www.2018companysecuritybreach.com" where the user misremembers the name and places the 2018 at the front of the address. Given the numerous possibilities for domain names of malicious campaigns, attempting to identify all, or even most, of the domain names for a malicious campaign can be difficult.

Overview

The technology presented herein enables the use of a clustering algorithm to identify additional malicious domains based on known malicious domains. In a particular embodiment, a method provides identifying a first plurality of domain names associated with a malicious domain campaign and seeding a first clustering algorithm with the first plurality of domain names. After seeding the first clustering algorithm, the method provides using the first clustering algorithm to process passive domain name system (DNS) records to identify and group a second plurality of domain names associated with the malicious domain campaign.

In some embodiments, the method provides transferring the second plurality of domain names to a domain filter, wherein the domain filter identifies domain names of the second plurality of domain names in network traffic. In those embodiments, upon identifying a domain name of the second plurality of domain names in the network traffic, the domain filter may provide a notification to a user indicating that the domain name is associated with a malicious domain campaign. Also in those embodiments, upon identifying a domain name of the second plurality of domain names in the network traffic, the domain filter may block the network traffic associated with the domain name.

In some embodiments, the method provides receiving at least a portion of the passive DNS records from a third-party system.

In some embodiments, the method provides monitoring network traffic for DNS messages and collecting at least a portion of the passive DNS records from the DNS messages.

In some embodiments, the method provides receiving user input identifying the first plurality of domain names.

In some embodiments, the method provides using the first clustering algorithm to also process information from one or more additional sources to identify and group the second plurality of domain names. In those embodiments, the one or more additional sources may include one or more of a "Whois" lookup, anti-virus appliances/applications, and the Border Gateway Protocol.

In some embodiments, the first clustering algorithm comprises density-based spatial clustering of applications with noise (DBSCAN), K-Means, or balanced iterative reducing and clustering using hierarchies (BIRCH).

In another embodiment, an apparatus is provided having one or more computer readable storage media and a processing system operatively coupled with the one or more computer readable storage media. Program instructions stored on the one or more computer readable storage media, when read and executed by the processing system, direct the processing system to identify a first plurality of domain names associated with a malicious domain campaign and seed a first clustering algorithm with the first plurality of domain names. after seeding the first clustering algorithm, the program instructions direct the processing system to use the first clustering algorithm to process passive domain name system (DNS) records to identify and group a second plurality of domain names associated with the malicious domain campaign.

In yet another embodiment, one or more computer readable storage media are provided having program instructions stored thereon. The program instructions, when read and executed by a processing system, direct the processing system to identify a first plurality of domain names associated with a malicious domain campaign and seed a first clustering algorithm with the first plurality of domain names. After seeding the first clustering algorithm, the program instructions direct the processing system to use the first clustering algorithm to process passive domain name system (DNS) records to identify and group a second plurality of domain names associated with the malicious domain campaign.

DETAILED DESCRIPTION

The technology described herein attempts to identify as many domain names associated with malicious activity (malicious domains) by leveraging clustering algorithms on passive domain name system (DNS) data, typically included in passive DNS records. Expanding the number of identified malicious domains increases the likelihood that a user will be prevented from accessing such domains inadvertently. For instance, domain filter executing on a user's computing system or in a firewall protecting the user's computing system may be provided with a list of malicious domains. If the domain filter intercepts a request directed towards a malicious domain (e.g., an HTTP request with a URL having the malicious domain), then the filter can block the request or warn the user that the user is about to access a known or suspected malicious domain.

Figure 1:
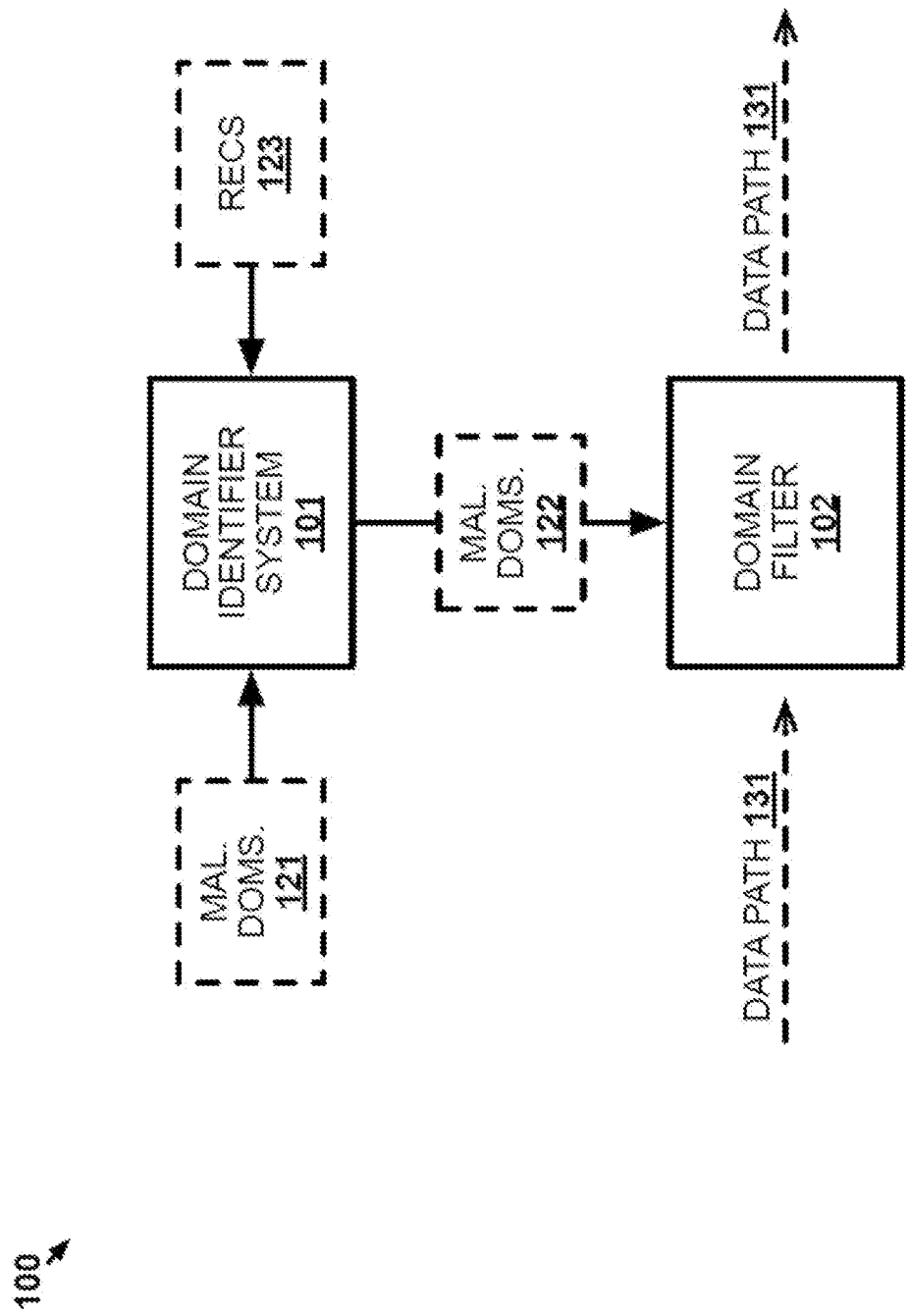
FIG. 1 illustrates an implementation for identifying domain names associated with malicious campaigns.

FIG. 1 illustrates implementation 100 for identifying domain names associated with malicious campaigns. Implementation 100 includes domain identifier system 101 and Domain filter 102. In operation, Domain filter 102 operates on network packet traffic transferring on data path 131. Domain filter 102 may be a network firewall, a computing system having anti-malware or anti-phishing software executing thereon, or some other type of computing system that operates on network packet traffic. Domain filter 102 therefore comprises wired and/or wireless network communication circuitry for exchanging data packets over data path 131 and processing circuitry for processing data packets received via data path 131. Domain filter 102 may further include one or more storage media, such as Random-Access Memory (RAM), hard disk drives, flash memory, etc. Data path 131 may traverse one or more networked computing systems, routers, switches, access points, or other type of network element. While only one URL filter is shown with respect to implementation 100, other implementations may include additional URL filters, which may be positioned along different data paths but operate in a manner similar to that described for Domain filter 102. For instance, a large enterprise network may include multiple network firewalls to ensure protection at various points in the network.

Domain filter 102 uses malicious domains provided thereto to identify packets on data path 131 that reference the malicious domain (e.g., packets carrying a Domain Name Service (DNS) request for a malicious domain). Domain identifier system 101 identifies the malicious domains that are used by Domain filter 102 when processing data packets received on data path 131. Domain identifier system 101 may be implemented in the same computing system as Domain filter 102 or may be a separate computing system having its own network communication circuitry, processing circuitry, storage media, etc. In one example, domain identifier system 101 may be implemented in a server of a data center in communication with Domain filter 102, and any other URL filters, under the purview of the server. Communications between domain identifier system 101 and Domain filter 102 may be exchanged outside of data path 131.

Figure 2:
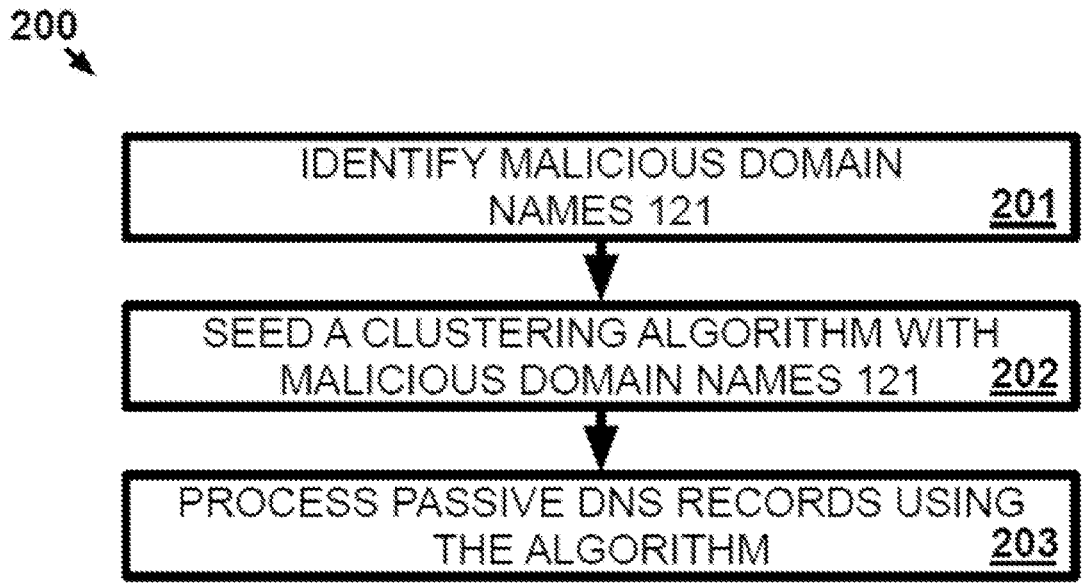
FIG. 2 illustrates a scenario for the implementation to identify domain names associated with malicious campaigns.

FIG. 2 illustrates scenario 200 for implementation 100 to identify domain names associated with malicious campaigns. In scenario 200, domain identifier system 101 identifies known malicious domains 121 that are associated with a malicious domain campaign (201). Known malicious domains 121 may be provided to domain identifier system 101 by a user, may be provided from another system that identified known malicious domains 121, or domain identifier system 101 may identify known malicious domains 121 using preliminary processing. The preliminary processing may include using regular expressions and/or distance functions with respect to domain names associated with legitimate campaigns in order to find known malicious domains 121 that are similar to those legitimate domains.

Domain identifier system 101 seeds a clustering algorithm with known malicious domains 121 (202). Known malicious domains 121 provide the clustering algorithm with a basis on which its processing will identify other malicious domains associated with the malicious campaign. The clustering algorithm may comprise the density-based spatial clustering of applications with noise (DB SCAN) algorithm, although other clustering algorithms may be used instead. After seeding the clustering algorithm, domain identifier system 101 uses the clustering algorithm to process passive DNS records 123 to identify and group identified malicious domains 122 associated with the malicious domain campaign (203). Passive DNS records 123 are obtained by monitoring network traffic and tracking DNS information about specific domain names included in that network traffic. In some cases, third party services or platforms are employed to collect passive DNS records 123. The information may include network addresses associated with each domain name, percentage of digits in domain, number of unique IPs seen for domain, number of unique TTLs (time to live) seen for the domain, length of longest meaningful substring, number of unique countries seen, age of the domain, daily similarity of passive DNS records, short-lived passive DNS history, and repeated pattern of passive DNS records. Other sources may also be used having information relevant to domain names, such as information from a "Whois" lookup, anti-virus appliances/applications, Border Gateway Protocol, or some other source.

Essentially, the clustering algorithm identifies and groups domain names that have similar characteristics. Initially, the similar characteristics will be based upon known malicious domains 121 but, as more malicious domains are identified, additional groups may be formed from similarities not necessarily shared with the known malicious domains 121. For example, domains that are associated with the same network address or subnet may be grouped. Likewise, a group may be further based on a time when the malicious domains were registered. For instance, malicious domains for a particular campaign are likely to be registered around the same time as a legitimate campaign. As such, even if two domains have other similarities, being too distant apart in time of registration may lead them to be grouped into different malicious campaigns. The machine learning afforded by the clustering algorithm will consider as many such factors as possible when identifying identified malicious domains 122 and performing its grouping thereof.

Once identified, domain identifier system 101 may send identified malicious domains 122 to domain filter 102. Domain filter 102 may then operate on network traffic on data path 131 to compare domains in the network traffic to those in identified malicious domains 122. If there is a match, domain filter 102 may block the network traffic including the matched domain, may notify the sender of that network traffic of the malicious domain, or may perform some other function. Domain identifier system 101 may also or instead provide identified malicious domains 122 to a user and may indicate the groupings of identified malicious domains 122 or may perform some other function with respect to identified malicious domains 122.

Figure 3:
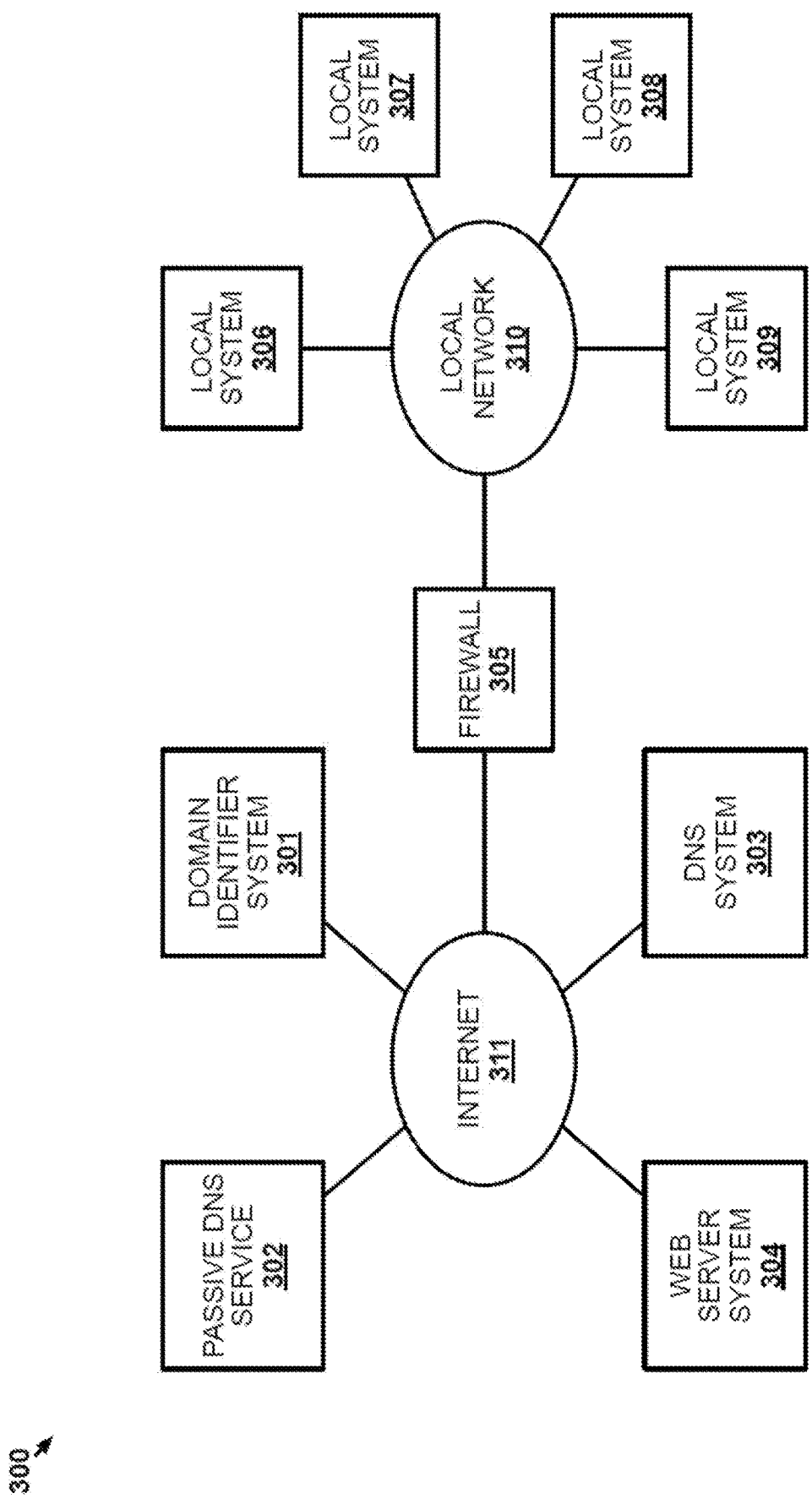
FIG. 3 illustrates another implementation for identifying domain names associated with malicious campaigns.

FIG. 3 illustrates implementation 300 for identifying domain names associated with malicious campaigns. Implementation 300 includes domain identifier system 301, passive DNS service 302, DNS system 303, web server system 304, firewall 305, local system 306, local system 307, local system 308, local system 309, local network 310, and Internet 311. While shown outside of local network 310, one or more of domain identifier system 301, passive DNS service 302, DNS system 303, and web server system 304 may be on local network 310 as well.

In operation, DNS system 303 receives DNS requests from systems, such as local system 306, local system 307, local system 308, and local system 309, that require an IP address associated with a domain name. For example, local system 307 may transfer a DNS request to DNS system 303 that requests an IP address to retrieve a website indicated by a domain name in the request. DNS system 303 may then return an IP address of web server system 304 as one of potentially multiple IP addresses associated with the domain name from the DNS request. Local system 307 can then communicate with web server system 304 using the IP address of web server system 304 to retrieve the website.

Firewall 305 regulates communications entering and exiting local network 310. Firewall 305 is capable of identifying communications associated with a particular domain name. For example, firewall 305 may be able to identify a domain name in a DNS request and block the DNS request if the domain name is known by firewall 305 to be a malicious domain. Domain identifier system 301 provides information indicating at least a portion of the malicious domains used by firewall 305 to determine whether communication traffic should be blocked. Blocking communication traffic based on domain names allows firewall 305 to protect against malicious domains even though the IP addresses associated with the malicious domains may change.

Figure 4:
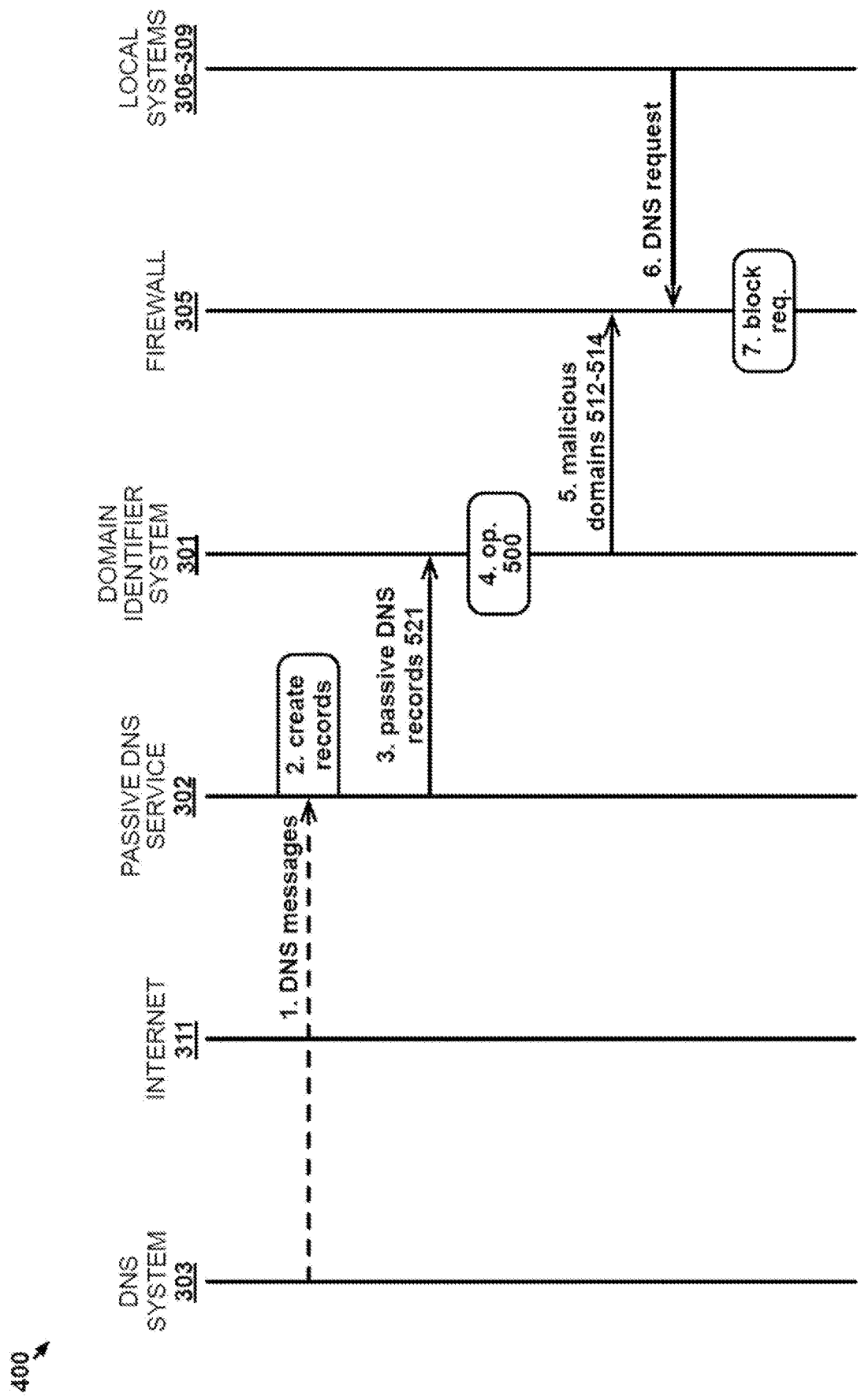
FIG. 4 illustrates a scenario for the other implementation to identify domain names associated with malicious campaigns.

FIG. 4 illustrates scenario 400 for implementation 300 to identify domain names associated with malicious campaigns. In scenario 400, DNS messages are exchanged with DNS system 303 at step 1 by computing systems, which may include local systems 306-309, requesting IP addresses associated with domain names identified in the DNS messages. Passive DNS service 302 obtains at least a copy of the DNS messages to create passive DNS records 521 at step 2 from DNS related information that can be gleaned from the DNS messages. In some examples, passive DNS service 302 may be a computing system in the data path between DNS system 303 and at least a portion of the computing systems exchanging the DNS messages with DNS system 303. Being in the data path allows passive DNS service 302 to obtain DNS information from within the DNS messages exchanged at step 1. In alternative examples, passive DNS service 302 may receive copies of the DNS messages from one or more other computing system that are in the data path or may receive the DNS information having already been extracted from the DNS messages by the other computing systems.

Passive DNS records 521 may indicate network addresses associated with each domain (identified by a domain name) in the DNS messages, percentage of digits in domain, number of unique IPs seen for domain, number of unique TTLs (time to live) seen for the domain, length of longest meaningful substring, number of unique countries seen, age of the domain, daily similarity of passive DNS records, short-lived passive DNS history, repeated pattern of passive DNS records, or some other type of DNS related information. In some cases, information, such as the repeated pattern of DNS records, may simply be derived from other records rather than being an independent record. It should be understood that steps 1 and 2 of scenario 400 are only one example of how to create passive DNS records, such as passive DNS records 521, and that other mechanisms for producing passive DNS records may also be used.

Domain identifier system 301 receives passive DNS records 521 at step 3 to use the information therein for identifying malicious domains. Passive DNS records 521 may be sent periodically by passive DNS service 302, may be requested by domain identifier system 301, or may be transferred on some other schedule. At step 4, domain identifier system 301 performs in accordance with scenario 500 identify and cluster malicious domains.

Figure 5:
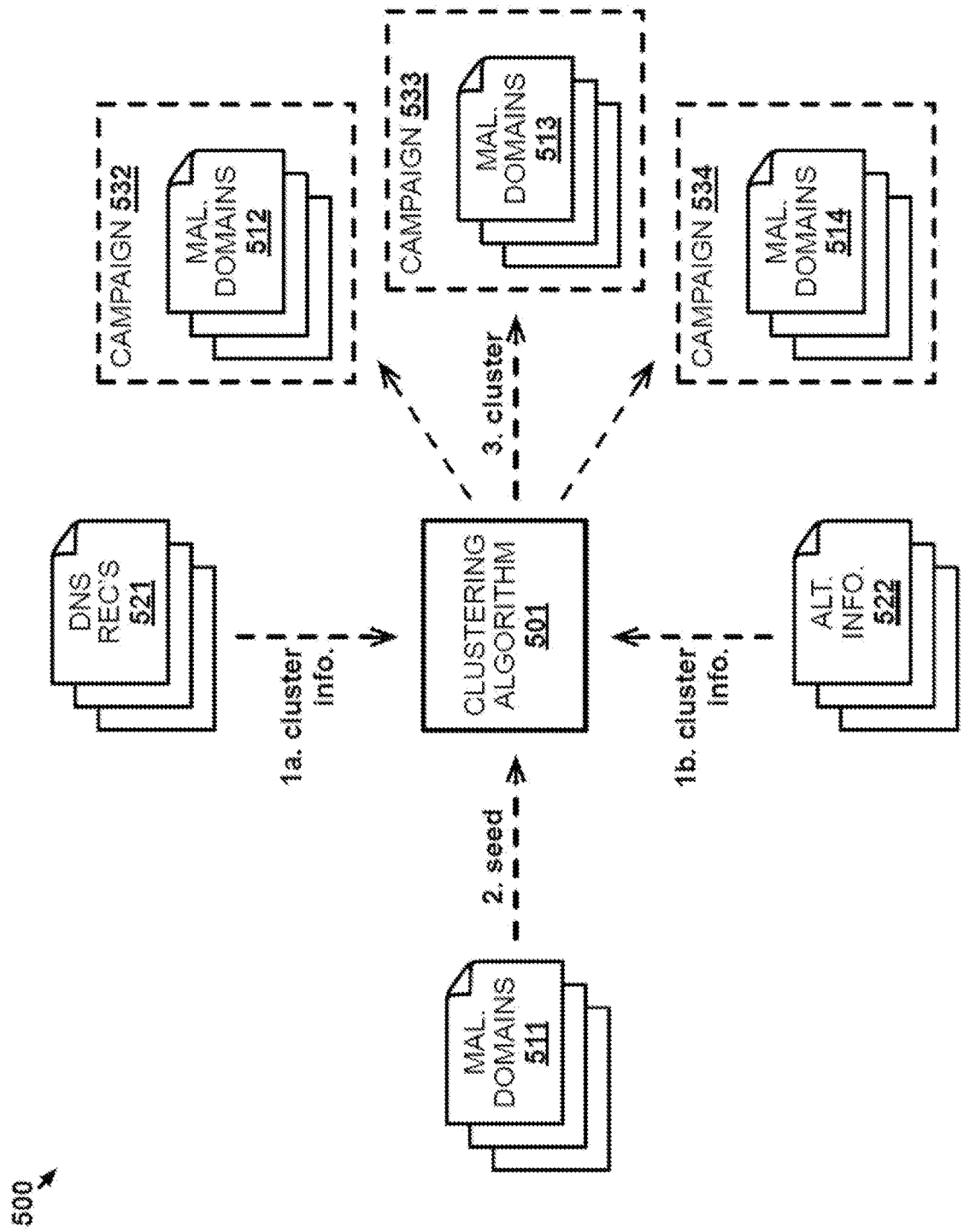
FIG. 5 illustrates another scenario for the other implementation to identify domain names associated with malicious campaigns.

FIG. 5 illustrates scenario 500 for implementation 300 to identify domain names associated with malicious campaigns. Scenario 500 describes how domain identifier system 301 uses clustering algorithm 501 to identify and cluster malicious domains. Clustering algorithm 501 may be density-based spatial clustering of applications with noise (DBSCAN), K-Means, or balanced iterative reducing and clustering using hierarchies (BIRCH), although other algorithms may instead be used.

Passive DNS records 521 are input at step 1a into clustering algorithm 501 and alternative information 522 is input into clustering algorithm 501 at step 1b. Alternative information 522 is information obtained from sources other than passive DNS service 302. For example, alternative information 522 may be information obtained by domain identifier system 301 performing a "Whois" lookup of one or more domain names, domain identifier system 301 receiving information about one or more domains from anti-virus appliances, such as firewall 305, and/or antivirus applications (e.g., antivirus applications executing on local systems 306-309), information obtained using the Border Gateway Protocol, or from some other source of potentially relevant information to clustering algorithm 501.

Known malicious domains 511 are also input into clustering algorithm 501 at step 2. Known malicious domains 511 may be provided to domain identifier system 301 for input into clustering algorithm 501 by a user of domain identifier system 301, by a third-party service, or by some other means. Known malicious domains 511 may include only domain names or may include other information associated with the domain names that may be beneficial when determining whether other domain names should be placed in the same cluster as any of the domain names in known malicious domains 511. For example, the information in known malicious domains 511 may be similar to the information included for domain names in passive DNS records 521. In some examples, domain identifier system 301 may determine the other information itself upon receiving known malicious domains 511. For example, domain identifier system 301 may query DNS system 303 for IP addresses associated with known malicious domains 511 that may be used by clustering algorithm 501.

Known malicious domains 511 are known to be used for one or more malicious campaigns. For example, one or more of the domain names identified by known malicious domains 511 may be used as part of a malicious campaign to defraud users looking for a valid website. In some examples, to further assist clustering algorithm 501, known malicious domains 511 may include an indication of which domains names therein are already known to be part of a same malicious domain campaign, while other examples may infer that two or more domain names are part of the same malicious domain campaign. From known malicious domains 511, clustering algorithm 501 clusters at step 3 additional domain names identified from passive DNS records 521 into campaigns with the domain names of known malicious domains 511. In this example, the malicious domains are clustered into three campaigns, malicious domain campaign 532, malicious domain campaign 533, and malicious domain campaign 534. It should be understood that any number of malicious domain campaigns may exist for malicious domains to be clustered into.

Generally, clustering algorithm 501 uses the information available to it from known malicious domains 511, passive DNS records 521, and alternative information 522 to cluster domain names within passive DNS records 521 with domain names of known malicious domains 511 that have similar attributes based on the information. In a basic example, one or more domain names in passive DNS records 521 may all be associated with a particular IP address as are one or more domain names in known malicious domains 511. Clustering algorithm 501 may then cluster those domain names associated with the IP address into the same group, which would be a malicious domain campaign for the purposes of this disclosure.

Clustering algorithm 501 in this example, ends up clustering malicious domains 512 into malicious domain campaign 532, malicious domains 513 into malicious domain campaign 533, and malicious domains 514 into malicious domain campaign 534. Not all domain names in passive DNS records 521 need be included in one of malicious domains 512, malicious domains 513, and malicious domains 514 since, in all likelihood, not all domain names in passive DNS records 521 are associated with malicious domain campaigns.

Referring back to scenario 400, domain identifier system 301 provides malicious domains 512, malicious domains 513, and malicious domains 514 at step 5 to firewall 305. In this example, firewall 305 does not need to receive an indication that malicious domains 512-514 are part of respective malicious domain campaigns 532-534. Although, in other examples, firewall 305 may be configured to treat domain names differently depending on with which of malicious domain campaigns 532-534 the domain names are associated and would therefore require receiving an indication of malicious domain campaigns 532-534 for malicious domains 512-514. When one of local systems 306-309 transfers a DNS request, having one or malicious domains 512-514 therein, to DNS system 303 at step 6, firewall 305 can recognize the malicious domain therein (e.g., through packet inspection techniques) and block the request from leaving local network 310 at step 7. In some examples, firewall 305 may also transfer a notification back to the one of local systems 306-309 that sent the DNS request. The notification may indicate that the DNS request was blocked and may indicate that the requested domain name is known to be malicious.

It should be understood that scenario 400 and scenario 500 are merely examples of how malicious domains 512-514 and their respective malicious domain campaigns 532-534 may be used. Malicious domains 512-514 and their respective malicious domain campaigns 532-534 may be used for other purposes.

Figure 6:
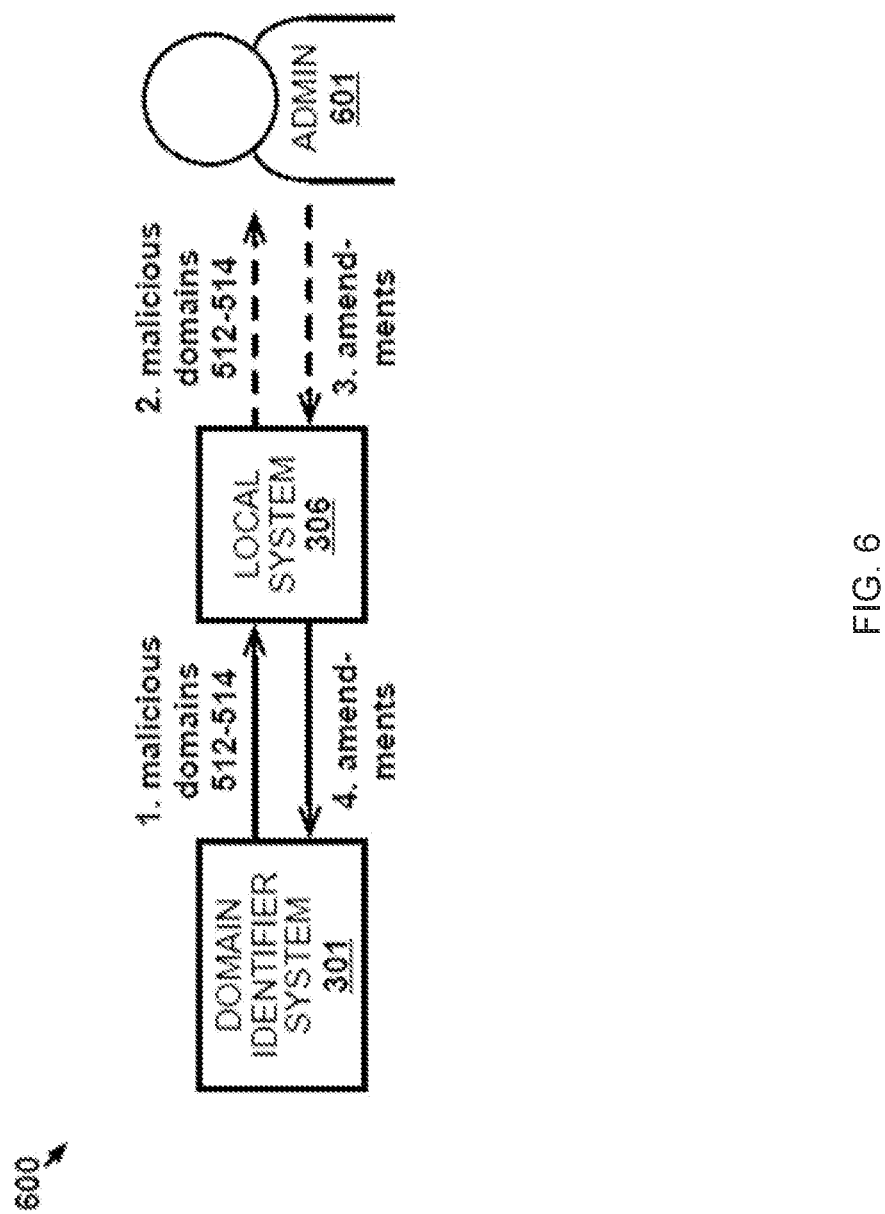
FIG. 6 illustrates yet another scenario for the other implementation to identify domain names associated with malicious campaigns.

FIG. 6 illustrates scenario 600 for implementation 300 to identify domain names associated with malicious campaigns. Scenario 600 describes how malicious domains 512-514 may be provided to a user, specifically administrator 601 of local network 310 operating local system 306 in this example. Domain identifier system 301 transfers malicious domains 512-514 at step 1 to local system 306 for review by administrator 601. To assist administrator 601 in their review, domain identifier system 301 may further indicate malicious domain campaigns 532-534 for each of malicious domains 512-514. Malicious domains 512-514 and, if available, malicious domain campaigns 532-534 are presented (e.g., displayed) at step 2 to administrator 601.

In some examples, administrator 601 may simply review malicious domains 512-514 and malicious domain campaigns 532-534 to make themselves aware of the malicious domain campaigns 532-534. Administrator 601 may also send out a notice to other users on local network 310 (e.g., those operating local systems 307-309) via their respective user systems, such as an email notification. Other examples may automate that notification process.

In this example, the user provides input into local system 306 at step 3 that amends malicious domains 512-514 and/or malicious domain campaigns 532-534. For instance, administrator 601 may notice that one or more domains were falsely identified as being malicious and indicates that by removing the one or more domains from malicious domains 512-514. Local system 306 transfers the amendments at step 4 to domain identifier system 301, which amends malicious domains 512-514 and/or malicious domain campaigns 532-534 accordingly. Within the context of scenario 400, scenario 600 may occur between steps 4 and 5. Thus, the malicious domains 512-514 that domain identifier system 301 transfers to firewall 305 at step 5 may include the amendments provided by administrator 601.

Figure 7:
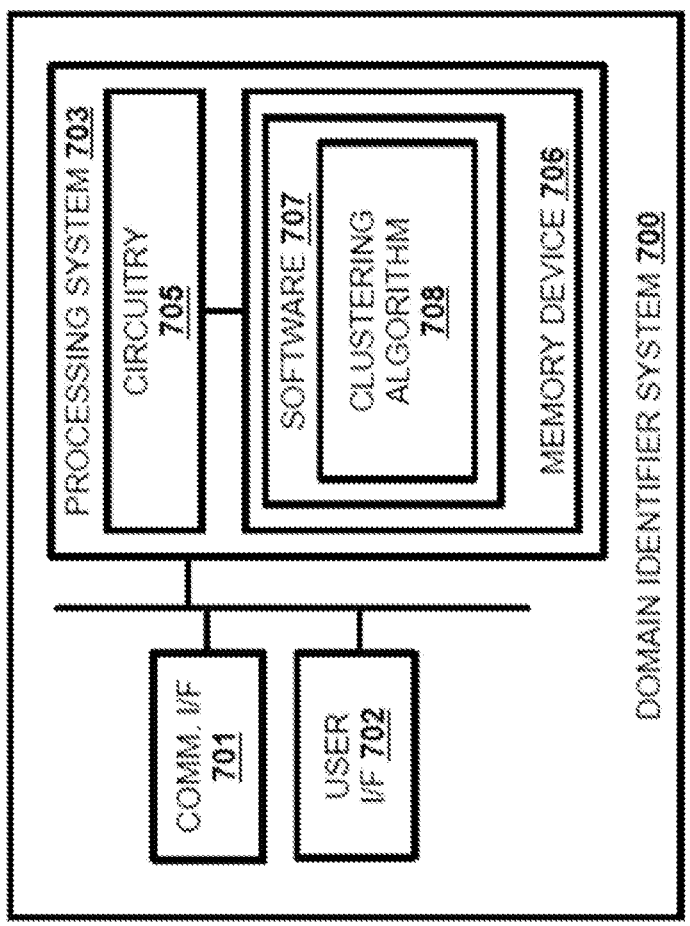
FIG. 7 illustrates a computing architecture for identifying domain names associated with malicious campaigns.

FIG. 7 illustrates domain identifier system 700 for immediately reconnecting a call to an agent in a contact center. Domain identifier system 700 is an example computing architecture for domain identifier system 101, although system 101 may use alternative configurations. A similar architecture may also be used for domain filter 102, although alternative configurations may also be used. Domain identifier system 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and/or other circuitry that retrieves and executes operating software 707 from memory device 706. Memory device 706 comprises a storage medium, such as a disk drive, flash drive, data storage circuitry, or some other memory apparatus. In no examples would memory device 706 be considered a propagated signal. Operating software 707 comprises computer programs, firmware, or some other form of machine-readable processing instructions. Operating software 707 includes clustering algorithm 708. Operating software 707 may further include an operating system, utilities, drivers, network interfaces, applications, or some other type of software. When executed by processing circuitry 705, operating software 707 directs processing system 703 to operate domain identifier system 700 as described herein.

In particular, seeding clustering algorithm 708 directs processing system 703 to identify a first plurality of domain names associated with a malicious domain campaign and seeding clustering algorithm 708 with the first plurality of domain names. After seeding the first clustering algorithm, clustering algorithm 708 is used to process passive DNS records to identify and group a second plurality of domain names associated with the malicious domain campaign.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

The invention claimed is:

1. A method comprising:
   intercepting a Domain Name System (DNS) request indicating a domain name, wherein the DNS request comprises one or more packets indicating first characteristics of the DNS request;
   generating first passive DNS records for the DNS request based, at least in part, on the first characteristics;
   determining that the first characteristics of the first passive DNS records are similar to second characteristics of second passive DNS records in a cluster, wherein the second passive DNS records indicate one or more domain names corresponding to a first malicious domain campaign, wherein the cluster is one of a plurality of clusters corresponding to a plurality of malicious domain campaigns, wherein the plurality of clusters was generated with a clustering algorithm seeded with third characteristics of third passive DNS records for domain names associated with corresponding ones of the plurality of malicious domain campaigns;
   based on determining that the first characteristics are similar to the second characteristics,
      associating the domain name with the first malicious domain campaign; and
      blocking the DNS request indicating the domain name; and
   updating the cluster of the second characteristics with the first characteristics.

2. The method of claim 1, further comprising:
   seeding the clustering algorithm with the third characteristics of the third passive DNS records for corresponding ones of the plurality of malicious domain campaigns; and
   applying the clustering algorithm with at least the third characteristics to obtain the plurality of clusters.

3. The method of claim 2, further comprising identifying the domain names associated with corresponding ones of the plurality of malicious domain campaigns based on at least one of regular expressions associated with the plurality of malicious domain campaigns and distance functions to domain names associated with the plurality of malicious domain campaigns.

4. The method of claim 1, wherein the clustering algorithm comprises at least one of density-based spatial clustering of applications with noise (DBSCAN), K-Means clustering, and balanced iterative reducing and clustering using hierarchies (BIRCH).

5. The method of claim 1, wherein determining that the first characteristics are similar to second characteristics comprises matching the domain name with one of the one or more domain names.

6. The method of claim 1, further comprising, based on determining that the first characteristics are similar to the second characteristics, blocking network traffic along a data path to the domain name.

7. The method of claim 1, further comprising updating the domain names associated with corresponding ones of the plurality of malicious domain campaigns based, at least in part, on user input.

8. A non-transitory computer readable medium having program code stored thereon, the program code comprising instructions to:
   intercept a Domain Name System (DNS) request indicating a domain name, wherein the DNS request comprises one or more packets indicating first characteristics of the DNS request;
   generate first passive DNS records for the DNS request based, at least in part, on the first characteristics;
   determine that the first characteristics of the first passive DNS records are similar to second characteristics of second passive DNS records in a cluster, wherein the second passive DNS records indicate one or more domain names corresponding to a first malicious domain campaign, wherein the cluster is one of a plurality of clusters corresponding to a plurality of malicious domain campaigns, wherein the plurality of clusters was generated with a clustering algorithm seeded with third characteristics of third passive DNS records for domain names associated with corresponding ones of the plurality of malicious domain campaigns;
   based on the program code to determine that the first characteristics are similar to the second characteristics, associate the domain name with the first malicious domain campaign; and
      block the DNS request indicating the domain name; and
   update the cluster of the second characteristics with the first characteristics.

9. The non-transitory computer readable medium of claim 8, further comprising program code to:
   seed the clustering algorithm with the third characteristics of the third passive DNS records for corresponding ones of the plurality of malicious domain campaigns; and apply the clustering algorithm with at least the third characteristics to obtain the plurality of clusters.

10. The non-transitory computer readable medium of claim 9, further comprising program code to identify the domain names associated with corresponding ones of the plurality of malicious domain campaigns based on at least one of regular expressions associated with the plurality of malicious domain campaigns and distance functions to domain names associated with the plurality of malicious domain campaigns.

11. The non-transitory computer readable medium of claim 8, wherein the clustering algorithm comprises at least one of density-based spatial clustering of applications with noise (DBSCAN), K-Means clustering, and balanced iterative reducing and clustering using hierarchies (BIRCH).

12. The non-transitory computer readable medium of claim 8, wherein the instructions to determine that the first characteristics are similar to second characteristics comprise instructions to match the domain name with one of the one or more domain names.

13. The non-transitory computer readable medium of claim 8, further comprising program to, based on the program code to determine that the first characteristics are similar to the second characteristics, block network traffic along a data path to the domain name.

14. The non-transitory computer readable medium of claim 8, further comprising program code to update the domain names associated with corresponding ones of the plurality of malicious domain campaigns based, at least in part, on user input.

15. An apparatus comprising:
a processor; and
a machine-readable medium having instructions stored thereon that are executable by the processor to cause the apparatus to:
intercept a Domain Name System (DNS) request indicating a domain name, wherein the DNS request comprises one or more packets indicating first characteristics of the DNS request;
generate first passive DNS records for the DNS request based, at least in part, on the first characteristics;
determine that the first characteristics of the first passive DNS records are similar to second characteristics of second passive DNS records in a cluster, wherein the second passive DNS records indicate one or more domain names corresponding to a first malicious domain campaign, wherein the cluster is one of a plurality of clusters corresponding to a plurality of malicious domain campaigns, wherein the plurality of clusters was generated with a clustering algorithm seeded with third characteristics of third passive DNS records for domain names associated with corresponding ones of the plurality of malicious domain campaigns;
based on the instructions executable by the processor to cause the apparatus to determine that the first characteristics are similar to the second characteristics, associate the domain name with the first malicious domain campaign; and
block network traffic along a data path to the domain name; and
update the cluster of the second characteristics with the first characteristics.

16. The apparatus of claim 15, wherein the machine-readable medium further has stored thereon instructions executable by the processor to cause the apparatus to:
seed the clustering algorithm with the third characteristics of the third passive DNS records for corresponding ones of the plurality of malicious domain campaigns; and
apply the clustering algorithm with at least the third characteristics to obtain the plurality of clusters.

17. The apparatus of claim 16, wherein the machine-readable medium further has stored thereon instructions executable by the processor to cause the apparatus to identify the domain names associated with corresponding ones of the plurality of malicious domain campaigns based on at least one of regular expressions associated with the plurality of malicious domain campaigns and distance functions to domain names associated with the plurality of malicious domain campaigns.

18. The apparatus of claim 15, wherein the clustering algorithm comprises at least one of density-based spatial clustering of applications with noise (DBSCAN), K-Means clustering, and balanced iterative reducing and clustering using hierarchies (BIRCH).

19. The apparatus of claim 15, wherein the instructions to determine that the first characteristics are similar to second characteristics comprise instructions executable by the processor to cause the apparatus to match the domain name with one of the one or more domain names.

20. The apparatus of claim 15, wherein the machine-readable medium further has stored thereon instructions executable by the processor to cause the apparatus to, based on the instructions executable by the processor to cause the apparatus to determine that the first characteristics are similar to the second characteristics, block the DNS request indicating the domain name.

* * * * *